Dec. 12, 1950  E. BOBARD  2,533,759
WHEELED MOWER AND DRIVE THEREFOR
Filed Feb. 28, 1945

Inventor
Emile Bobard
by his attorneys
Howson and Howson

Patented Dec. 12, 1950

2,533,759

UNITED STATES PATENT OFFICE 2,533,759

WHEELED MOWER AND DRIVE THEREFOR

Emile Bobard, Beaune, France

Application February 28, 1945, Serial No. 580,219
In France June 3, 1942

1 Claim. (Cl. 56—260)

My invention has for its object improvements in the mounting of mowing-machine implements and the like, which are carried by agricultural vehicles adapted to operate as mowing or reaping machines and the like, said mechanisms being actuated through the rotation of the vehicle wheels.

A related object is to provide an improved mounting and arrangement of the means to transmit the power from the wheels to the mowing implements or other operated devices.

Heretofore the mounting of such mechanisms and their transmissions had to be on chassis specially designed with such purpose in view.

The present invention concerns more particularly a novel structure of a mounting for association with a wheel, such mounting being capable of use with any sort of wheeled vehicle. By this mounting the cutting implements of a mowing machine, or other like devices, are operated by rotation of the wheel through a transmission or gearing carried by the mounting; moreover the mounting is able to oscillate with relation to the chassis which supports it. Thus movement of the cutting implement is permitted into different cutting positions above the ground, or to raise the implements out of normal cutting range.

The adaptability of use of this mounting to all sorts of vehicle chassis avoids the need to buy equipment for special purposes since equipment for other purposes can be employed in connection with this invention. Practically this invention imposes no burden on such other equipment. Hence a considerable saving results.

Figure 1:
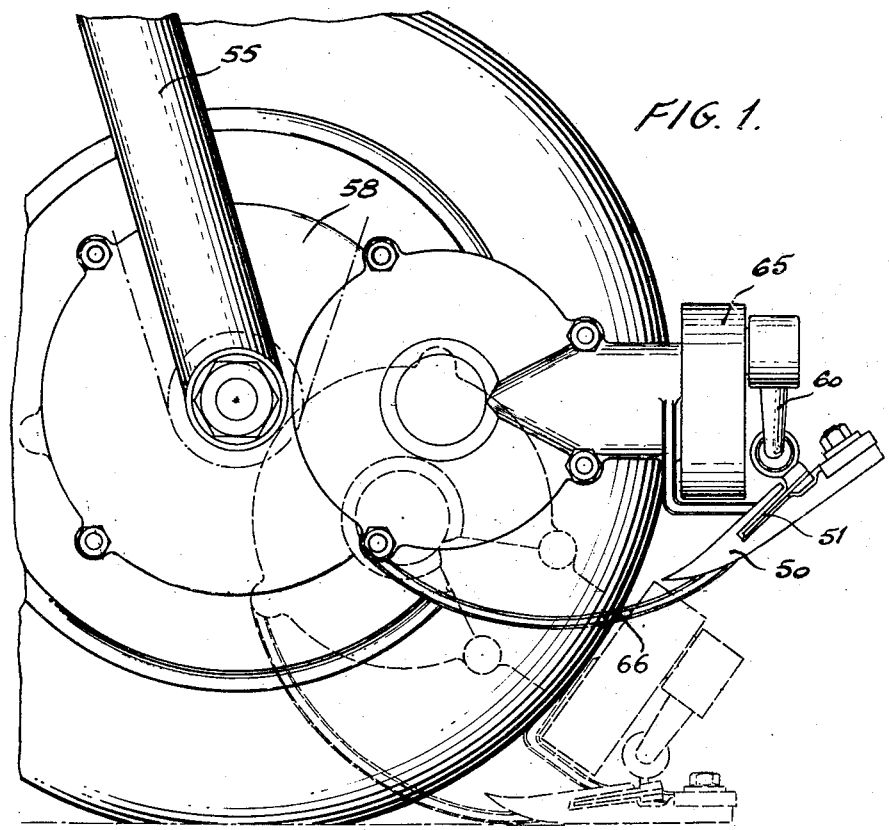
Figure 2:
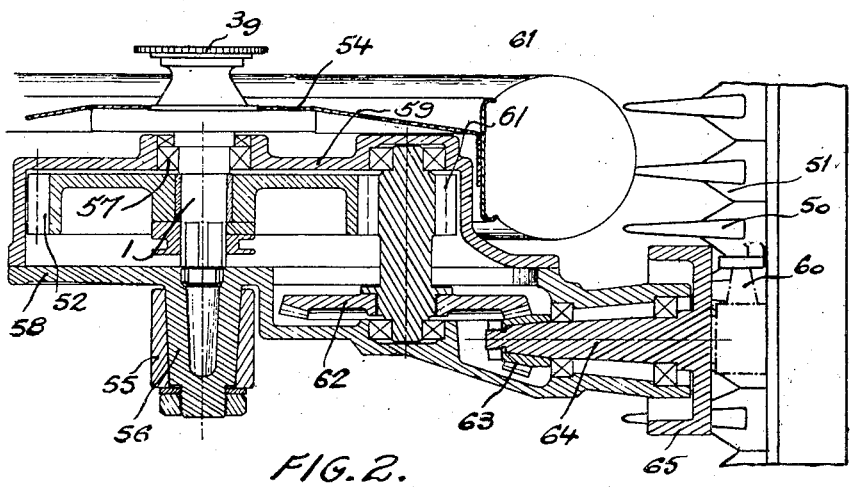

In the drawing Fig. 1 is a side elevation view of the invention; and Fig. 2 is a horizontal section view taken through the wheel axis of Fig. 1.

Referring to the drawings, the invention is shown as applied to the control of the bar of a mowing-machine provided with mechanical control means of the usual type. For such an application, the bar of the mowing machine proper comprises a stationary comb 50 and a cutter 51 and is arranged on the outside of the wheel; however, all the driving mechanism of this bar, i. e. of the cutter may be located inside the wheel.

The driving means which is rigid with the wheel is a gear 52 keyed to the wheel axis 1 which is in its turn rigid with the wheel disk 54. An arm 55, rigid with the frame or chassis, has on its lower end a hollow bearing within which is mounted a hub 56. The hub extends laterally from one member 58 of a hollow casing 58—59. An axle 1 is rigid with the wheel and extends through a bearing 57 in the inside casing member 59 and also coaxially into the hub 56. The axle 1 rotates within the hub 56 and the bearing 57 of the casing, said axle having on one end thereof a gear or sprocket 39 for driving any auxiliary parts on the vehicle.

Inside this casing are arranged the parts required for transmitting the movements of the gear 52 rotating integrally with the wheel to the connecting rod 60 which produces the reciprocatory movements of the cutter 51 with reference to the comb 50.

These transmitting parts are constituted, in the case illustrated, by a pinion 61 meshing with the gear 52 and the axis of which carries a bevel gear 62 meshing in its turn with a bevel gear 63 keyed to the shaft 64 lying parallel with the plane of the gear 62 and the end of which carries a crank plate 65 to which is pivotally secured the connecting rod 60.

The cutter mechanism 50—51 is mounted on the casing 58—59 not only through the controlling connecting rod 60, but also through the bracket 66 rigid with the casing 58—59 and which allow the cutter bar to pass from its operative position shown in dot-and-dash lines to its inoperative position shown in full lines through a rocking motion imparted to the whole of the casing 58—59 round the axis of the wheel. Despite this ability to rock for operative to inoperative position, the cutter and its supporting and operating means are normally fixed with reference to the wheel and the driving or control gear 52.

The rotation of the wheel may be used also for controlling any apparatus located at any point of the frame by means of a chain pinion 39 arranged coaxially with the wheel on the side thereof which is opposed to the side carrying the mechanism driving the cutter bar.

Obviously, my invention is by no means limited to the form of execution which has been described and illustrated and have been chosen solely by way of example. It is apparent that the invention is applicable to vehicles of the most varied types. My invention is also applicable to wheels of any type and by no means only to wheels provided with a solid disk as illustrated.

I claim:

In a wheeled vehicle, the combination of a wheel, a hollow part normally fixed with respect to the vehicle, a rotary axis for the wheel supported by said hollow part, an auxiliary rotating mechanism carried by said hollow part, a gear inside said hollow part transmitting the power from the wheel axis to said auxiliary mechanism, and means permitting rocking said hollow part together with the gear and auxiliary mechanism between two angular positions corresponding respectively to the operative and inoperative positions of said auxiliary mechanism.

EMILE BOBARD.

REFERENCES CITED

The following references are of record in the file of this patent:

UNITED STATES PATENTS

| Number | Name | Date |
| --- | --- | --- |
| 946,101 | Bohne | Jan. 11, 1910 |
| 1,535,255 | Ryan | Apr. 28, 1925 |
| 1,615,126 | Lindstet | Jan. 18, 1927 |
| 1,731,332 | Burrows | Oct. 15, 1929 |
| 2,155,183 | Dursch | Apr. 18, 1939 |
| 2,317,636 | Parker | Apr. 27, 1943 |
| 2,319,718 | Brooks | May 18, 1943 |